United States Patent
Baca

(10) Patent No.: US 10,459,782 B2
(45) Date of Patent: Oct. 29, 2019

(54) SYSTEM AND METHOD OF IMPLEMENTING HEARTBEATS IN A MULTICORE SYSTEM

(71) Applicant: NXP USA, Inc., Austin, TX (US)

(72) Inventor: David Baca, Roznov pod Radhostem (CZ)

(73) Assignee: NXP USA, Inc., Austin, TX (US)

(*) Notice: Subject to any disclaimer, the term of this patent is extended or adjusted under 35 U.S.C. 154(b) by 155 days.

(21) Appl. No.: 15/693,252

(22) Filed: Aug. 31, 2017

(65) Prior Publication Data

US 2019/0065296 A1 Feb. 28, 2019

(51) Int. Cl.
*G06F 11/07* (2006.01)

(52) U.S. Cl.
CPC .......... *G06F 11/079* (2013.01); *G06F 11/076* (2013.01); *G06F 11/0724* (2013.01); *G06F 11/0793* (2013.01)

(58) Field of Classification Search
CPC .............. G06F 11/0724; G06F 11/079; G06F 11/0793; G06F 11/076
See application file for complete search history.

(56) References Cited

U.S. PATENT DOCUMENTS

| | | | | |
|---|---|---|---|---|
| 4,710,926 A | * | 12/1987 | Brown | G06F 11/006 709/248 |
| 5,805,785 A | * | 9/1998 | Dias | G06F 11/1438 714/20 |
| 5,909,540 A | * | 6/1999 | Carter | G06F 9/5016 714/4.4 |
| 6,711,700 B2 | * | 3/2004 | Armstrong | G06F 11/0757 712/13 |
| 7,028,218 B2 | * | 4/2006 | Schwarm | G06F 11/2038 711/162 |
| 7,142,650 B1 | * | 11/2006 | Kult | H04M 3/24 379/112.01 |
| 7,219,254 B2 | * | 5/2007 | Rathunde | G06F 11/0712 714/1 |
| 7,421,478 B1 | * | 9/2008 | Muchow | G06F 9/44505 709/209 |
| 7,590,898 B2 | | 9/2009 | Coekaerts | |
| 7,716,520 B2 | * | 5/2010 | Tabei | G06F 11/0724 714/10 |
| 7,958,396 B2 | * | 6/2011 | Chitsaz | G06F 11/0757 714/26 |

(Continued)

OTHER PUBLICATIONS

Jeffrey, Casey et al., "Towards Byzantine Fault Tolerance in Many-core Computing Platforms," 13th IEEE International Symposium on Pacific Rim Dependable Computing, Dec. 2007; pp. 256-259.

(Continued)

*Primary Examiner* — Yolanda L Wilson

(57) ABSTRACT

Counter based heartbeat messaging is implemented by storing heartbeat count vectors and health vectors of each core in a shared memory. Each core implements its heartbeat operation by storing the heartbeat count and health vectors from shared to local memory. A core uses its locally stored vectors to detect fault conditions at the other cores, and to achieve interactive consistency. Any core can initiate a system reaction to a core having a failing health status when a defined number of cores agree with that status.

20 Claims, 8 Drawing Sheets

(56) References Cited

U.S. PATENT DOCUMENTS

| | | | |
|---|---|---|---|
| 8,074,123 B2* | 12/2011 | Ohira | G06F 11/0793 714/51 |
| 8,850,262 B2* | 9/2014 | Cardinell | G06F 11/0757 714/10 |
| 2009/0198958 A1* | 8/2009 | Arimilli | H04L 45/06 712/29 |
| 2012/0089861 A1* | 4/2012 | Cardinell | G06F 11/0724 714/2 |

OTHER PUBLICATIONS

Mushtaq, Hamid et al., "Survey of Fault Tolerance Techniques for Shared Memory Multicore/Multiprocessor Systems," 2011 IEEE 6th International Design and Test Workshop; Dec. 2011; pp. 12-17.

Pease, M. et al., "Reaching Agreement in the Presence of Faults," Journal of the Association for Computing Machinery, vol. 27, No. 2, Apr. 1980, pp. 228-234.

Satzger, Benjamin et al., "A Lazy Monitoring Approach for Heartbeat-Style Failure Detectors," IEEE Third International Conference on Availability, Reliability, and Security; Mar. 2008, pp. 404-409.

Schneider, Fred B., "Byzantine Generals in Action: Implementing Fail-Stop Processors," ACM Transactions on Computer Systems, vol. 2, No. 2, May 1984; pp. 145-154.

Van Renesse et al., "A Gossip-Style Failure Detection Service," Dept of Computer Science, Cornell University, 16 pages.

Dolev et al., "When consensus meets self-stabilization," Journal of Computer and System Sciences 76 (2010) 884-900, 17 pages.

\* cited by examiner

266

| Time | HBC/Core | LOCAL HEARTBEAT VECTORS (ALL OK) ||||||||| 
|------|----------|---------|---------|---------|---------|---------|---------|---------|---------|---------|
|      |          | C1_LHBV ||| C2_LHBV ||| C3_LHBV |||
|      |          | C1_LHB1 | C1_LHB2 | C1_LHB3 | C2_LHB1 | C2_LHB2 | C2_LHB3 | C3_LHB1 | C3_LHB2 | C3_LHB3 |
| T0   | 0/X      | X       | X       | X       | X       | X       | X       | X       | X       | X       |
| T1   | 1/1      | 100     | 100     | 100     | 100     | 100     | 100     | 100     | 100     | 100     |
| T2   | 1/1      | 101 (T2)| 100     | 100     | 100     | 100     | 100     | 100     | 100     | 100     |
| T4   | 1/1      | 101     | 100 (T0)| 100 (T0)| 100     | 100     | 100     | 100     | 100     | 100     |
| T5   | 1/1      | X       | X       | X       | X       | X       | X       | X       | X       | X       |
| T6   | 1/2      | 101     | 100     | 100     | 100     | 100     | 100     | 100     | 100     | 100     |
| T7   | 1/2      | 101     | 100     | 100     | 100     | 101 (T7)| 100     | 100     | 100     | 100     |
| T9   | 1/2      | 101     | 100     | 100     | 101 (T2)| 101     | 100 (T0)| 100     | 100     | 100     |
| T10  | 1/2      | X       | X       | X       | X       | X       | X       | X       | X       | X       |
| T11  | 1/3      | 101     | 100     | 100     | 101     | 101     | 100     | 100     | 100     | 100     |
| T12  | 1/3      | 101     | 100     | 100     | 101     | 101     | 100     | 100     | 100     | 101 (T12)|
| T14  | 1/3      | 101     | 100     | 100     | 101     | 101     | 100     | 101 (T2)| 101 (T7)| 101     |
| T15  | 1/3      | X       | X       | X       | X       | X       | X       | X       | X       | X       |
| T16  | 2/3      | 101     | 100     | 100     | 101     | 101     | 100     | 101     | 101     | 101     |
| T17  | 2/3      | 101     | 100     | 100     | 101     | 101     | 100     | 101     | 101     | 102 (T17)|
| T19  | 2/3      | 101     | 100     | 100     | 101     | 101     | 100     | 101 (T2)| 101 (T7)| 102     |
| T20  | 2/3      | X       | X       | X       | X       | X       | X       | X       | X       | X       |
| T21  | 2/2      | 101     | 100     | 100     | 101     | 101     | 100     | 101     | 101     | 102     |
| T22  | 2/2      | 101     | 100     | 100     | 101     | 102 (T22)| 100    | 101     | 101     | 102     |
| T24  | 2/2      | 101     | 100     | 100     | 101 (T2)| 102     | 102(T17)| 101     | 101     | 102     |
| T25  | 2/2      | X       | X       | X       | X       | X       | X       | X       | X       | X       |
| T26  | 2/1      | 101     | 100     | 100     | 101     | 102     | 102     | 101     | 101     | 102     |
| T27  | 2/1      | 102 (T27)| 100    | 100     | 101     | 102     | 102     | 101     | 101     | 102     |
| T29  | 2/1      | 102     | 102 (T22)| 102 (T17)| 101  | 102     | 102     | 101     | 101     | 102     |
| T30  | 2/1      | X       | X       | X       | X       | X       | X       | X       | X       | X       |

166

| HBC/Core | Time | SHARED HEARTBEAT VECTORS (ALL OK) ||||||||| 
|----------|------|---------|---------|---------|---------|---------|---------|---------|---------|---------|
|          |      | C1_SHBV ||| C2_SHBV ||| C3_SHBV |||
|          |      | C1_SHB1 | C1_SHB2 | C1_SHB3 | C2_SHB1 | C2_SHB2 | C2_SHB3 | C3_SHB1 | C3_SHB2 | C3_SHB3 |
| T0       | 0/X  | 100     | 100     | 100     | 100     | 100     | 100     | 100     | 100     | 100     |
| T5       | 1/1  | 101 (T2)| 100 (T0)| 100 (T0)| 100     | 100     | 100     | 100     | 100     | 100     |
| T10      | 1/2  | 101     | 100     | 100     | 101 (T2)| 101 (T7)| 100 (T0)| 101     | 101     | 101     |
| T15      | 1/3  | 101     | 100     | 100     | 101     | 101     | 100     | 101 (T2)| 101 (T7)| 100 (T12)|
| T20      | 2/3  | 101     | 100     | 100     | 101     | 101     | 100     | 101 (T2)| 101 (T7)| 102(T17)|
| T25      | 2/2  | 101     | 100     | 100     | 101 (T2)| 102 (T22)| 102 (T17)| 101  | 101     | 102     |
| T30      | 2/1  | 102 (T27)| 102 (T22)| 102 (T17)| 101 | 102     | 103 (T17)| 101   | 101     | 102     |

*FIG. 8*

| Time | HBC/Core | LOCAL HEALTH STATUS VECTORS (ALL OK) ||||||||| 
| | | C1_LHV ||| C2_LHV ||| C3_LHV |||
| | | C1_LH1 | C1_LH2 | C1_LH3 | C2_LH1 | C2_LH2 | C2_LH3 | C3_LH1 | C3_LH2 | C3_LH3 |
|---|---|---|---|---|---|---|---|---|---|---|
| T0 | 0/X | X | X | X | X | X | X | X | X | X |
| T1 | 1/1 | X | OK | OK | OK | X | OK | OK | OK | X |
| T3 | 1/1 | X | OK (T3) | OK (T3) | OK | X | OK | OK | OK | X |
| T5 | 1/1 | X | X | X | X | X | X | X | X | X |
| T6 | 1/2 | X | OK | OK | OK | X | OK | OK | OK | X |
| T8 | 1/2 | X | OK | OK | OK (T8) | X | OK (T8) | OK | OK | X |
| T10 | 1/2 | X | X | X | X | X | X | X | X | X |
| T11 | 1/3 | X | OK | OK | OK | X | OK | OK | OK | X |
| T13 | 1/3 | X | OK | OK | OK | X | OK | OK (T13) | OK (T13) | X |
| T15 | 1/3 | X | X | X | X | X | X | X | X | X |
| T16 | 2/3 | X | OK | OK | OK | X | OK | OK | OK | X |
| T18 | 2/3 | X | OK | OK | OK | X | OK | OK (18) | OK (18) | X |
| T20 | 2/3 | X | X | X | X | X | X | X | X | X |
| T21 | 2/2 | X | OK | OK | OK | X | OK | OK | OK | X |
| T23 | 2/2 | X | X | X | OK (T23) | X | OK (T23) | X | X | X |
| T25 | 2/2 | X | X | X | X | X | X | X | X | X |
| T26 | 2/1 | X | X | X | OK | X | OK | OK | OK | X |
| T28 | 2/1 | X | OK (T28) | OK (T28) | X | X | X | X | X | X |
| T30 | 2/1 | X | X | X | X | X | X | X | X | X |

| Time | HBC/Core | SHARED HEALTH STATUS VECTORS (ALL OK) ||||||||| 
| | | C1_SHV ||| C2_SHV ||| C3_SHV |||
| | | C1_SH1 | C1_SH2 | C1_SH3 | C2_SH1 | C2_SH2 | C2_SH3 | C3_SH1 | C3_SH2 | C3_SH3 |
|---|---|---|---|---|---|---|---|---|---|---|
| T0 | 0/X | X | OK | OK | OK | X | OK | OK | OK | X |
| T5 | 1/1 | X | OK (T3) | OK (T3) | OK | X | OK | OK | OK | X |
| T10 | 1/2 | X | OK | OK | OK (T8) | X | OK (T8) | OK | OK | X |
| T15 | 1/3 | X | OK | OK | OK | X | OK | OK (T13) | OK (T13) | X |
| T20 | 2/3 | X | OK | OK | OK | X | OK | OK (T18) | OK (18) | X |
| T25 | 2/2 | X | OK | OK | OK (T23) | X | OK (T23) | OK | OK | X |
| T30 | 2/1 | X | OK (T28) | OK (T28) | OK | X | OK | OK | OK | X |

SYSTEM AND METHOD OF IMPLEMENTING HEARTBEATS IN A MULTICORE SYSTEM

FIELD OF THE DISCLOSURE

The present disclosure relates generally to digital systems and methods, and more particularly to clocking digital synchronous logic.

BACKGROUND

The practice of monitoring heartbeats maintained by elements of a system to infer faults is historically performed by a dedicated monitoring device that monitors each other devices' heartbeat to determine if each device is healthy. One or more of the monitored devices can itself monitor the monitoring device to ensure its health. However, such centralized monitoring can result in ambiguity as to which core is failing, and such techniques can require a heartbeat history of each monitored element be maintained over many heartbeat cycles.

BRIEF DESCRIPTION OF THE DRAWINGS

The present disclosure may be better understood, and its numerous features and advantages made apparent to those skilled in the art by referencing the accompanying drawings. Embodiments incorporating teachings of the present disclosure are shown and described with respect to the drawings presented herein, in which:

FIG. 8 is a tabular representation of the memory of FIG. 2 and of the memory of FIG. 5, and their contents over time.

FIG. 9 is a tabular representation of the memory of FIG. 3 and of the memory of FIG. 6, and their contents over time.

FIG. 10 is a tabular representation of the memories of FIG. 3, FIG. 5, and FIG. 6, and their contents over time, and a tabular representation of intermediate calculations made by the cores.

DETAILED DESCRIPTION OF THE DRAWINGS

Each core of a plurality of cores stores a heartbeat vector and a health vector in a shared memory region. Each cores' heartbeat vector in shared memory includes a heartbeat last stored to shared memory, and a last known heartbeat count for each other one of the cores. Each cores' health vector in shared memory includes a last stored health status for each other one of the cores, as calculated during a previous heartbeat operation. During the heartbeat operation of a core, the heartbeat and health vectors of each core are loaded from shared to local memory. The core then updates its locally stored heartbeat count. Next, the core can determine the health status of each other core by comparing heartbeat count information of its heartbeat vector to the heartbeat count information of each other cores' heartbeat vector. If a failing health status is determined for any one of the other cores, the core implementing the heartbeat operation will determine if any other core has calculated the same failing health status for that core, and, if so, will generate a failure indicator.

At the end of each heartbeat cycle, a core updates its heartbeat vector in shared memory by storing each core's current heartbeat from local to its shared heartbeat vector. The core also updates its health vector in shared memory by storing the health vectors calculated for each core during the current heartbeat operation. In another embodiment, a core can determine the health status of a particular core by comparing the health statuses of that particular core as determined by the other cores. For example, a core implementing its heartbeat procedure can conclude another core is failing if two or more other cores have already come to that conclusion. Various embodiment will be better understood with reference to the following figures.

Figure 1:
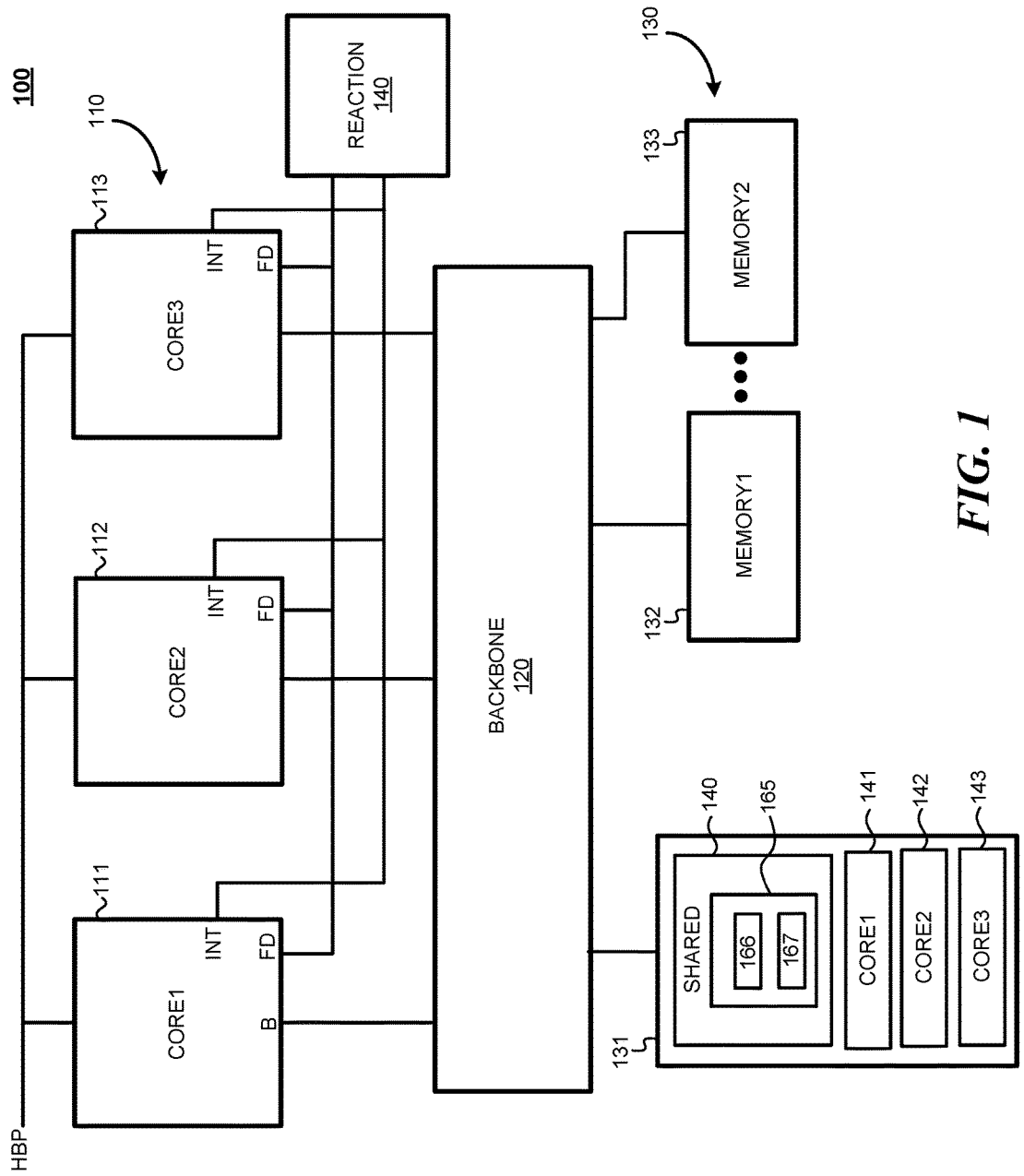
FIG. 1 is a block diagram illustration of a system in accordance with an embodiment of the present disclosure.

FIG. 1 illustrates a data processor system 100 that includes circuitry for implementing a heartbeat protocol to detect failure of a core in a multi-core system. The data processing system 100 includes a plurality of cores 110 and a plurality of computer accessible storage media 130. Each of the plurality of cores 110 and storage media 130 are connected to a data backbone 120 that can transfer information amongst these devices. At least one core of the plurality of cores 110 is connected to reaction circuitry 140 that implements desired error processing when heartbeat monitoring determines one of the plurality of cores has failed.

For simplicity, the plurality of cores 110 are illustrated to include three cores 111-113, labeled CORE_1, CORE_2, and CORE_3, respectively. It will be appreciated that data processor systems having greater than three cores can also implement the heartbeat features described herein. Each one of the plurality of cores 110 can be an instruction based data processor that is symmetric or asymmetric to each other core, so long as they implement the heartbeat protocol described herein.

For ease of discussion, it is presumed that each core of the plurality of cores 110 are symmetric to each other. The plurality of storage media 130 includes storage media 131-133. Each one of the plurality of storage media 130 can represent specific storage devices, or specific types of memory. For ease of discussion, it is presumed that the each one of the storage media 131-133 represents a different type of storage media. For example, it is presumed that: storage media 131 represents a fast system memory, such as a dynamic or static volatile memory, that is mapped to a system memory map, and can be referred to herein as memory 131; storage media 132 represents a solid-state non-volatile memory, such as flash memory, that is mapped to the system memory map; storage media 133 represents a hard drive, or other mass storage device that has a slower access time than does the memory 131.

Memory 131 can be partitioned, and is illustrated to include partitions 140-143. Partition 140 is configured to be accessible by each one of the plurality of cores 110 and can be referred to as "shared memory", while partitions 141-143 are configured to be accessible only by a specific core. For example, partition 141 is accessible by core 111, partition 142 is accessible by core 112, and partition 143 is accessible by core 113. According to an embodiment, the plurality of cores 110, the backbone 120, and system memory 131 are implemented at a common semiconductor die, or at a plurality of semiconductor die that are mounted on a common substrate, such as a package substrate. It will be appreciated that one or more of the reaction circuitry 140 and the memory 132 can also be implemented at a common die, or upon a common substrate.

During operation, each one of the plurality of cores 110 receives a common signal, referred to herein as a HeartBeat Pulse (HBP), that indicates to each one of the plurality of cores 110 the beginning of a heartbeat cycle of the system. The HBP can include a periodic pulse, wherein the period is equal to a desired system heartbeat period, during which each one of the plurality of processors implements the heartbeat procedure disclosed herein. Alternatively, HBP can be a clock signal from which a count is maintained by each one of the plurality of cores 110 to determine the beginning of consecutive heartbeat periods. For ease of discussion, it is presumed that the signal HBP is a signal having a periodic pulse that defines the system heartbeat period.

During each heartbeat cycle, a normally operating core performs a heartbeat operation that updates the core's heartbeat count (HBC), determines a health status of each other core of the plurality of cores 110, and detects whether any of the other cores of the plurality of cores 110 are in a failure mode. At the end of its heartbeat operation, each core stores a heartbeat vector (HBV) and a health vector in shared memory 140. The HBV that is written to shared memory 140 by a core includes its own HBC and a most recently known HBC for each other core of the plurality of cores. The health vector that is written to shared memory 140 by a core includes a health indicator, also referred to as a health status, for each other core that was calculated by the core during its heartbeat operation. By way of example, the HBVs and health vectors are presumed to be stored at a portion 165 of shared memory 140, also referred to as memory 165, and more specifically, a memory portion 166 of includes the shared HBVs and a memory portion 167 includes the shared health vectors.

Figure 2:
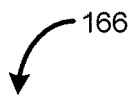
FIG. 2 is a block diagram illustration of a portion of shared memory where heartbeat count vectors are stored for each core.

FIG. 2 illustrates an embodiment of memory portion 166 at which the HBV of each core is saved. The mnemonic "Cx_SHBV" is used to represent the individual HBV of each core, and can be interpreted as follows:
  x is an integer set corresponding to the cores of the system, e.g., x=1, 2, 3 for the embodiment of FIG. 1;
  the characters "Cx_" indicate the owning core of a vector, for example, a vector having the characters "C1_" in its label is owned by CORE_1;
  the letter "S" indicates the vector is stored in shared memory; and
  the characters "HBV" indicate the label corresponds to a heartbeat vector.

Thus, the HBV owned, and therefore maintained, by CORE_1 is labelled C1_SHBV, the HBV owned by CORE_2 is labelled C2_SHBV, and the HBV owned by CORE_3 is labelled C3_SHBV. For ease of discussion, the value and storage location of a vector can be referenced using the same label. Thus, it will be appreciated that the label C1_SHBV can be used to refer to a value and the storage location at which the value is stored.

Each HBV includes three HBCs, one for each core of the system 100. In FIG. 2, the mnemonic of each heartbeat vector's three HBCs is the form "Cx_SHBy", wherein:
  the characters "Cx_" of an HBC indicate which core owns the HBC, where the letter "x" of an HBC corresponds to the same value as the letter "x" in the HBV to which the HBC belongs, for example, any HBC having the characters "C1_" is owned by CORE_1, and is thus a member of the HBV labeled C1_SHBV, which is also owned by CORE_1;
  the letter "S" indicates the HBC is stored in shared memory; and
  the letters "HBy" indicate to which core the particular HBC corresponds, where y is an integer of a set corresponding to the number of cores, e.g., y=1, 2, or 3, thus, the label C1_SHB1 refers the HBC of CORE_1 that is represented in the vector C1_SHBV, the label C1_SHB2 refers the HBC of CORE_2 that is represented in the vector C1_SHBV, and the label C1_SHB3 refers the HBC of CORE_3 that is represented in the vector C1_SHBV.

The term "current heartbeat count" or "current HBC", as used herein in reference to a specific core, or a specific core's HBV, is intended to refer to that specific core's HBC as stored in its HBV. For reasons that will be better understood below, the term "last known heartbeat count of a specific core to different core", and its variants, as used herein is intended to refer to an HBC of the specific core as stored in the different core's HBV. For example: the current HBC of CORE_1 in shared memory 166 is C1_SHB1, the last known HBC of CORE_2 to CORE_1 in shared memory 166 is C1_SHB2, and the last known HBC of CORE_3 to CORE_1 in shared memory is C1_SHB3. Likewise, it can be said that C1_SHB2 is the HBC of CORE2 last known to CORE_1.

Figure 3:
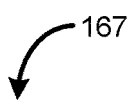
FIG. 3 is a block diagram illustration of a portion of shared memory where health vectors are stored for each core.

FIG. 3 illustrates a memory portion 167 of shared memory 165 at which each core's health vector is saved. The mnemonic "Cx_SHV" is used to represent each individual health vector as follows:
  x is an integer of a set corresponding to the cores of the system, e.g., x=1, 2, 3 for the embodiment of FIG. 1;
  the characters "Cx_" indicate the owning core of a vector, for example, a vector having the characters "C1_" in its label is owned by CORE_1;
  the letter "S" indicates the vector is stored in shared memory; and
  the characters "HV" indicate the label corresponds to a health vector.

Each health vector includes three health statuses, one for each core of the system 100. In FIG. 3, the mnemonic of each health vector's three health statuses is the form "Cx_SHy", wherein:
  the characters "Cx_" of a health status indicates the core that calculated and, therefore, owns the health status, as described with respect to the HBCs above;
  the letter "S" indicates the health status is stored in shared memory; and
  the letters "SHy" indicate to which core the particular health status corresponds, in a similar manner as described for HBCs, above, thus, a health status having the characters "C1_SH2" in its label is the health status of CORE_2 that was calculated by CORE_1, and most recently stored in local memory.

Figure 4:
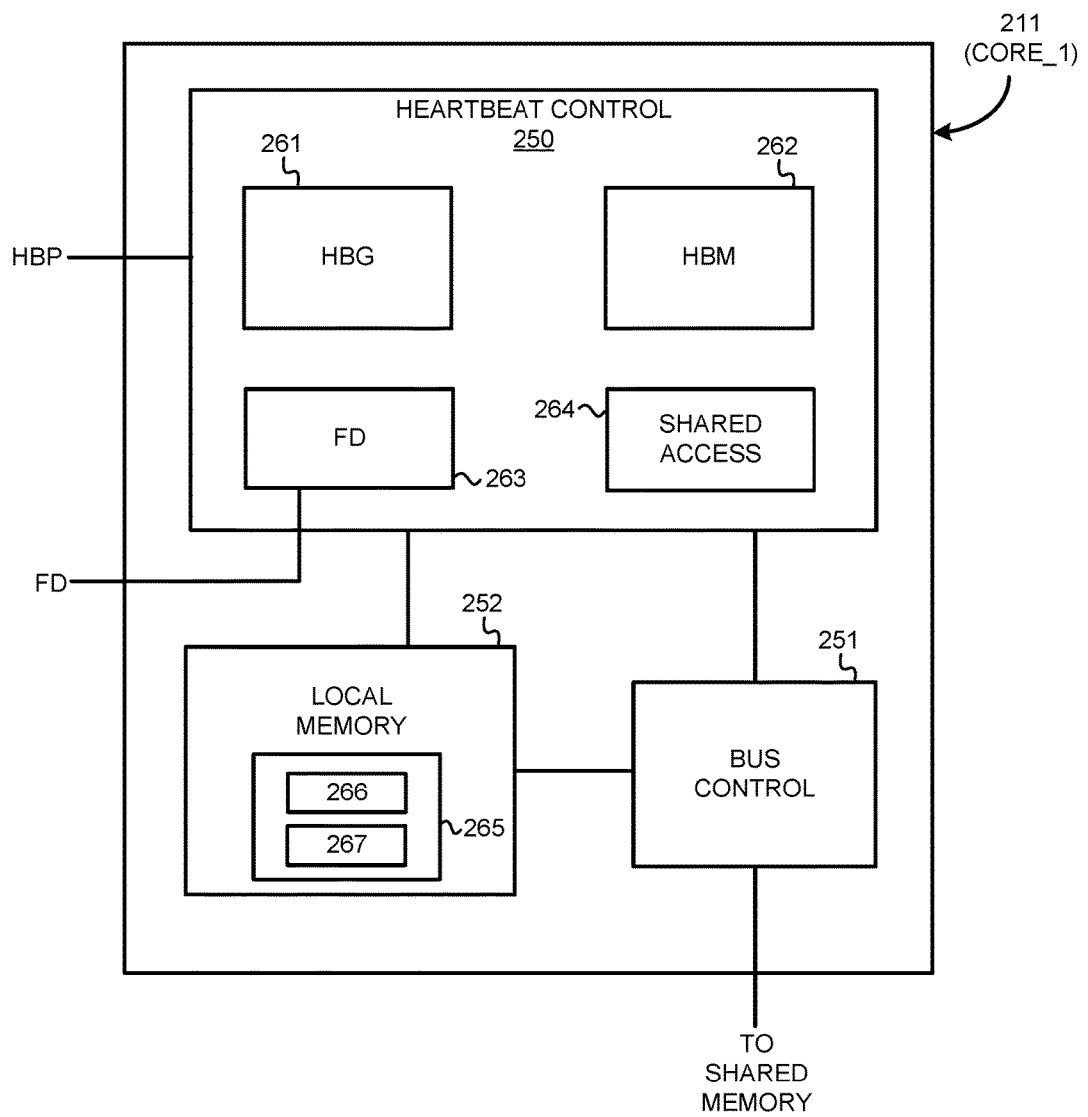
FIG. 4 is block diagram illustration of an embodiment of a representative core of FIG. 1.

FIG. 4 illustrates a core 211 that is a more detailed embodiment of each of the cores of FIG. 1, by virtue of their being presumed to be symmetric. Core 211 includes heartbeat controller (HBC) 250, bus controller 251, and local memory 252. The heartbeat controller 250 includes a heartbeat generator (HBG), 261 a heartbeat monitor 262 (HBM), a shared access controller 261, and a failure detector 263 (FD). The heartbeat controller 250 is connected to interconnect HBP, to local memory 252, and to bus controller 251.

Figure 5:
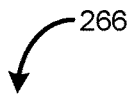
FIG. 5 is a block diagram illustration of a portion of a core's local memory where heartbeat count vectors are stored for each core.

Local memory 252 includes memory portions 266 and 267, collectively memory 265, at which HBVs and health vectors are locally stored during a heartbeat operation. FIG. 5 illustrates memory portion 266 in greater detail, at which the HBV of each core is locally saved subsequent to being read from shared memory 166. The mnemonic "Cx_LHBV" is used to represent each cores' individual HBV, and the mnemonic Cx_LHBy is used to reference the HBVs individual HBCs. Each of these mnemonics can be interpreted as described with reference to FIG. 2 and FIG. 3, except that the letter "L" is used to reference HBVs and HBCs stored in local memory 266, instead of the letter "S", which is used to reference HBVs and HBCs stored in shared memory 166.

Figure 6:
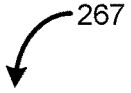
FIG. 6 is a block diagram illustration of a portion of a core's local memory where health vectors are stored for each core.

FIG. 6 illustrates memory portion 267 of local memory 265, at which the health vectors read from shared memory 166 are stored for use by CORE_1, in greater detail. The mnemonic "Cx_LHV" is used to represent each individual health vector, and the mnemonic Cx_LHy is used to reference a health status of each other core. Each of these health vector mnemonics can be interpreted as described above, except that the letter "L" is used to reference the health vectors and health status stored in local memory 267, instead of the letter "S", which is used to reference HBVs and HBCs stored in shared memory 167.

During is heartbeat operation, referring to FIG. 4, the heartbeat controller 250 of CORE_1 interfaces with the bus controller 251 to copy the HBV and health vector of each core from shared memory 165 to local memory 265, to update its current heartbeat in local memory (C1_LHB1), to calculate and store in local memory a health status for each of the other cores (C1_LH2 and C1_LH3), to determine if either of the other cores (CORE_2 and CORE_3) have failed, and to write updated vectors C1_SHBV and C1_SHV to shared memory. Each of CORE_2 and CORE_3 perform similar operations during the heartbeat cycle.

Figure 7:
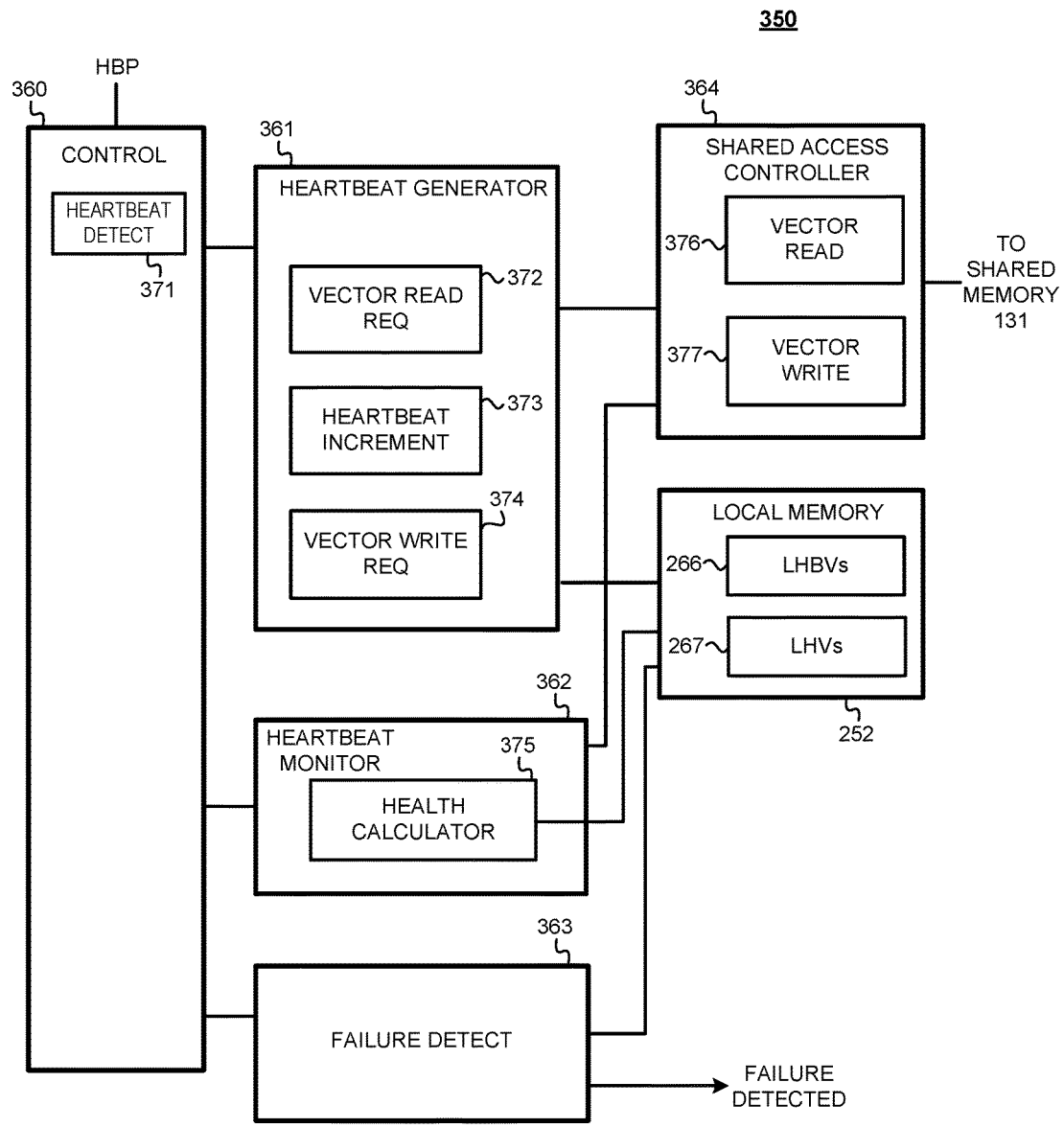
FIG. 7 is a block diagram illustration of an embodiment of a heartbeat controller of the core of FIG. 4.

FIG. 7 illustrates a heartbeat controller 350 that is a detailed embodiment of heartbeat controller 250. Heartbeat controller 350 includes a controller 360 that is connected to the HBP interconnect, the heartbeat generator 361, the heartbeat monitor 362, and the failure detect circuit 263. Each of the heartbeat generator 361, the heartbeat monitor 362, and the failure detect circuit 263 are connected to the local memory 252. The heartbeat generator 361 and the heartbeat monitor 362 are connected to the shared access controller 364, which can communicate with the shared memory 131 via the backbone 120, for example.

Controller 360 includes heartbeat detect circuit 371 that receives signal HBP to detect the beginning of each heartbeat cycle. By way of example, it is presumed that the beginning of each heartbeat cycle is indicated by a pulse of signal HBP, and that each normally operating core of the plurality of cores 110 implements its heartbeat procedure once during each heartbeat cycle. For ease of discussion, it is presumed the cores do not implement their respective heartbeat procedures concurrently, e.g., that is, heartbeat procedures amongst cores are not interleaved. For example, a semaphore can be maintained in shared memory amongst the plurality of cores 110 so that only one core is implementing its heartbeat procedure at a time. It is further assumed that the order in which cores implement their heartbeat procedures during a particular heartbeat cycle is not constant, and that a normally operating core can occasionally miss executing its heartbeat procedure during a heartbeat cycle.

At the end of a heartbeat cycle, presumed to be time T0 by way of example and as illustrated at FIG. 8, each core has completed its heartbeat procedure, resulting in shared memory 167 having updated SHBVs for each core. Also at T0, each HBV and health status vector stored in local memory 265 has expired, no longer exists, or is otherwise not available.

FIG. 8 is a tabular representation of the contents of shared memory 166 and of local memory 266 of the various cores over time. The first column, labeled "Time" indicates a sequential point (Tx) of time at which information stored at the corresponding memory was changed. The second column labeled "HBC/Core" identifies, using the mnemonic "x/y", a current heartbeat cycle associated with the entry, represented by the integer "x", and a core represented by the integer "y" that is modifying the contents of the memory during its heartbeat operation at the corresponding time.

The first entry, T0, of the tabular representation of local memory 266 is unique in that it represents the time just before a first heartbeat cycle is described, and thus has an HBC/Core value of "0/X", where "0" indicates the entry is not associated with a heartbeat cycle that is discussed, and "X" indicates the entry is not associated with any specific core because no core is implementing its heartbeat procedure at T0. Thus, the vectors C1_LHBV through C3_LHBV of local memory 266 of each core are set to a value of "X" to indicate no valid HBVs are stored in local memory of any core. Instead, each core's HBV is only maintained in shared memory 166 at T0, not local memory. Specifically, at T0, the shared memory 166 stores heartbeat vectors C1_SHBV through C3_SHBV having valid heartbeat counts, each presumed to be 100, which can represent an initial heartbeat value after a system reset condition.

Upon detecting a new heartbeat cycle, the heartbeat generator 361 of each core enables its vector read request circuitry 372 (FIG. 7) to provide a vector read command to the shared access controller 364 requesting each cores' HBV and health vector stored in shared memory 166 be copied to local memory 266. In response to receiving the vector read command, vector read circuitry 376 of the shared access controller 364 communicates with shared memory 131 to retrieve the HBC vectors from shared memory 166, and store them in local memory 266. As discussed above, it is presumed that only one core can perform its heartbeat operation at a time, which can be implemented by a first-come first-served protocol using a semaphore (not shown) in shared memory. In the example of FIG. 8, heartbeat cycle 1 extends from T1-T15, as indicated by the HBC portion of the HBC/Core field having a value of one (1) for each of these entries. The values of the Core portions of the HBC/Core fields indicate that during heartbeat cycle 1 CORE_1 is the first core to perform its heartbeat operation, followed by CORE_2 and CORE_3.

At T1 of FIG. 8, the vector read circuitry 376 of CORE_1 has retrieved its own SHBV and the SHBV of each other core from shared memory 166, e.g., C1_SHBV-C3_SHBV from entry T0, and stored the retrieved values at CORE_1's local memory 266 as C1_LHBV-C2_LHBV, respectively. It will be appreciated that each entry of table 266 represents the local memory of the core currently implementing its heartbeat operations. Therefore, entry T1 represents the contents of CORE_1's local memory 266. It will also be appreciated, that unless otherwise noted, memory tables only include an entry for a particular time if a value of the table is updated between that time and the previous time entry. For example, because no shared heartbeat vectors were updated in shared memory 166 at T1, there is no T1 entry at memory table 166 of FIG. 8.

In response to storing the LHBVs of each core in local memory 266 of CORE_1 at T1, the vector read circuitry 376 can notify the heartbeat generator 361 of CORE_1 that there are valid LHBVs in its local memory 266. In response, the heartbeat increment circuitry 373 of CORE_1 updates its current heartbeat (C1_LHB1) in local memory 266 by incrementing it from 100 to 101 as shown at T2 of table 266. To facilitate clarity, a parenthetical indictor is included with each updated field of a memory table entry to highlight those fields of the entry that have been updated since a previous entry of the table. Furthermore, the value of the parenthetical indicator is the time entry showing when the updated value was itself updated by its owning core. Thus, entry C1_LHB1 includes a parenthetical indicator because it was updated from 100 to 101 at T2, by CORE_1. The value of the parenthetical indictor at field C1_LHB1 for entry T2 is also "T2" because the update of value C1_LHB1 at T2 was performed by its owning core, e.g., CORE_1 incremented its current heartbeat value, C1_LHB1, at T2.

As will be will be discussed in detail below with reference to FIG. 9, at time T3 the health calculator 375 stores a calculated a health status vector for CORE_1 that is used to determine whether one of the other cores, CORE_2 or CORE_3, are in a failure mode. It will be appreciated, however, that neither memory table 266 nor memory table 166 of FIG. 8 include an entry T3 because neither the local nor shared heartbeat memories have been updated at T3.

After determining whether a core failure has been detected at any of the other cores, discussed below, the heartbeat generator 361 of CORE_1 enables its vector write request circuitry 374 to update its locally stored HBV, C1_LHBV, to include the locally stored current heartbeat counts of CORE_2 and CORE_3. Thus, at T4, C2_LHB2 is copied to C1_LHB2 and C3_LHB3 is copied to C1_LHB3. The update of C1_LHBV is indicated at entry T4 by the inclusion of parenthetical indicators at entries C1_LHB2 and C1_LHB3. Each of these parenthetical indicators has a value of T0 to indicate that, as of T1 when CORE_1 read the HBCs, neither CORE_2 nor CORE_3 had updated its current HBC since T0. Once CORE_1 updates its heartbeat count vector, C1_LHBV, in local memory 266, the vector write request circuitry 374 can provide a vector write command to the shared access controller 364 requesting that the now updated HBC vector of CORE_1 be copied from local memory 266 to shared memory 166. In response, the vector write circuitry 377 of the shared access controller 364 stores the value of C1_LHBV from CORE_1's local memory 266 as C1_SHBV in shared memory 166, as illustrated at entry T5 of memory table 166, thus updating the current HBCs of each core as currently known to CORE_1.

The inclusion of parenthetical indicators at entry T5 of memory table 166 highlights the fact that fields C1_SHB1, C1_SHB2, and C1_SHB3 of C1_SHBV have each updated since T0, though their values have not necessarily changed. In particular, C1_CHB1 has a parenthetical indicator value of T2 to indicate heartbeat count was updated by its owning core, CORE_1, at T2; C1_CHB2 and C1_CHB3 have parenthetical indicator values of T0 to indicate that while their values were updated in shared memory at T5, neither of these heartbeat counts have themselves been updated by their owning cores, CORE_2 and CORE_3, respectively, since T0. Also at time T5, by virtue of having been saved to shared memory, the HBVs that were stored at local memory 266 of CORE_1 are no longer valid, and are therefore set to X at entry T5 of memory table 266 to indicate they are no longer needed or valid, thus, freeing the local memory space of CORE_1 for other processes.

The next core to implement its heartbeat operation during heartbeat cycle 1 is CORE_2, as indicated in FIG. 8 by field HBC/Core of entry T6 having a value of ½, where 2 indicates the core implementing its heartbeat operation. Because each entry of table 266 represents the local memory of the core currently implementing its heartbeat operations, entry T6 represents the contents of CORE_2's local memory 266. At T6, the vector read circuitry 376 of CORE_2 began its heartbeat operation by storing to its local memory 266 each core's SHBV as retrieved from shared memory 166. Next, at T7, CORE_2 increments its locally stored current heartbeat count, C2_LHB2, from 100 to 101. As discussed below, the calculated health statuses and failure calculations are stored by CORE_2 at T8. Next, CORE_2 enables its vector write request circuitry 374 to update its locally stored HBV, C2_LHBV, to include the locally stored current heartbeat counts of CORE_1 and CORE_3. Thus, at T9, C1_LHB1 is copied to C2_LHB1 and C3_LHB3 is copied to C2_LHB3. The update of C2_LHBV is indicated at entry T9 by the inclusion of parenthetical indicators at entries C2_LHB1 and C2_LHB3.

At T10, the updated value of C2_LHBV has been written to shared memory 166 (C2_SHBV). The inclusion of parenthetical indicators at entry T10 of memory table 166 highlights the fact that fields C2_SHB1, C21_SHB2, and C2_SHB3 of C2_SHBV have each updated since T5. In particular, C2_CHB1 has a parenthetical indicator value of T2 to indicate this heartbeat count was updated by its owning core, CORE_1, at T2; C2_CHB2 has a parenthetical indicator value of T7 to indicate this heartbeat count was updated by its owing core, CORE_2, at T7; and C2_CHB3 has a parenthetical indicator value of T0 to indicate its owning core, CORE_3, has not updated its heartbeat count since T0. Also at time T10, by virtue of having been saved to shared memory, the HBVs that were stored at local memory 266 of CORE_2 are no longer valid, and are therefore set to X.

The next core to implement its heartbeat operation during heartbeat cycle 1 is CORE_3, as indicated in FIG. 8 by field HBC/Core of entry T11 having a value of ⅓, where 3 indicates the core implementing its heartbeat operation. Because each entry of table 266 represents the local memory of the core currently implementing its heartbeat operations, entry T11 represents the contents of CORE_3's local memory 266. At T11, the vector read circuitry 376 of CORE_3 began its heartbeat operation by storing to its local memory 266 each core's SHBV as retrieved from shared memory 166. Next, at T12, CORE_3 increments its locally stored current heartbeat count, C3_LHB3, from 100 to 101. As discussed below, the calculated health statuses and failure calculations are stored by CORE_2 at T13. Next, CORE_3 enables its vector write request circuitry 374 to update its locally stored HBV, C3_LHBV, to include the locally stored current heartbeat counts of CORE_1 and CORE_2. Thus, at T14, C1_LHB1 is copied to C3_LHB1 and C2_LHB2 is copied to C3_LHB2. The update of C3_LHBV is indicated at entry T14 by the inclusion of parenthetical indicators at entries C3_LHB1 and C3_LHB2.

At T15, the updated value of C3_LHBV has been written to shared memory 166 (C3_SHBV). The inclusion of parenthetical indicators at entry T15 of memory table 166 highlights the fact that fields C3_SHB1 through C3_SHB3 of C3_SHBV have each been updated since T10. In particular, C3_CHB1 has a parenthetical indicator value of T2 to indicate this heartbeat count was updated by its owning core, CORE_1, at T2; C3_CHB2 has a parenthetical indicator value of T7 to indicate this heartbeat count was updated by its owing core, CORE_2, at T7; and C3_CHB3 has a parenthetical indicator value of T12 to indicate this heartbeat count was updated by its owning core, CORE_3, at T12. Also at time T16, by virtue of having been saved to shared memory, the HBVs that were stored at local memory 266 of CORE_3 are no longer valid, and are therefore set to X.

Entries T16-T30 of FIG. 8 indicate HBVs stored at memories 166 and 266 by each core during heartbeat cycle 2. The order in which each core implements its heartbeat operation during heartbeat cycle 2 is indicated is reversed from that of the heartbeat cycle 1, as indicated by the HBC/Core field for these entries. Thus, CORE_3 executes its heartbeat first in heartbeat cycle 2, followed by CORE_2 and CORE_3. The contents of the HBVs from T16-T30 are not discussed in detail, as they have been updated in the same manner as described with reference to heartbeat cycle 1, just in a different order.

In addition to handling heartbeat vectors during each heartbeat operation, each core also handles health vectors. Therefore, in addition to receiving heartbeat vectors from shared memory at the beginning of each heartbeat procedure, each core also receives health vectors for each core. FIG. 9 includes tabular representations of the content of shared memory 167 and of local memory 267, at which health vectors are stored, during the same heartbeat operations describe with reference to FIG. 8. The mnemonics used in the memory tables 167 and 267 of FIG. 9 are the same as for heartbeat counts, previously discussed, except that the single letter "H" is used to reference a health status, also referred to as a health indicator, instead of the letters "HB", which are used to represent heartbeat counts.

At T0 the shared memory 167 includes health vectors C1_SHV through C3_SHV, which are presumed to have been updated by a previous heartbeat cycle, or to be initial values based on a reset condition. Because a core cannot determine its own health status, a core's own health status is listed as "X" in the health vector that it owns. The health status of each other core is shown in shared memory table 167 to be OK at T0. According to the embodiment disclosed herein, values of the health indicators include OK, LF, and HF, wherein LF and HF are indicators that the health of a core is "NOT OK", "LF" indicates a core has determined that one of the other cores may be experiencing a low-frequency failure by virtue of not updating its heartbeat count as often as expected, and "HF" indicates a core has determined that one of the other cores may be experiencing a high-frequency failure by virtue of updating its heartbeat count more often than expected. As noted with reference to FIG. 8, the first entry for T0 with respect to the tabular representation of local memory 267 is unique in that it represents the time just before a new heartbeat cycle begins, as indicated by the value of HBC/Core at time T0 being "O/X". Because no core is implementing its heartbeat procedure at T0, the vectors C1_LHV through C3_LHV of local memory 267 are set to a value of "X" to indicate no valid health vector is stored in any local memory 267 of any core. This is because each core's health vector is maintained in shared memory not local memory, see tabular representation of shared memory 167 at FIG. 9, when not performing a heartbeat operation.

At T1 of FIG. 9, the vector read operation of CORE_1 that retrieved the HBVs from shared memory 166 also retrieves the shared health vectors from shared memory 167. This results in the values of C1_SHV through C3_SHV, as shown at entry T0 of table 167, being stored in local memory 267 of CORE_1 at T1 as local health vectors C1_LHV-C3_LHV, respectively, as shown at entry T1 of table 267. As with table 266, it will be appreciated that each entry of table 267 represents the local memory of the core currently implementing its heartbeat operations. Therefore, entry T1 represents the contents of CORE_1's local memory 267. In response to CORE_1's heartbeat increment circuitry 373 updating CORE_1's current heartbeat at T2, the health calculator 375 is notified that the health status of each other core needs to be calculated based on the local HBCs. The health calculator circuitry 375 can be implemented by CORE_1 based on the pseudo code of Table 1.

TABLE 1

| | CORE_1 Health Status Calculation |
|---|---|
| 1 | C1_LH2, C1_LH3 <-- OK; |
| 2 | if C2_LHB2 - C1_LHB2 > Threshold_HF |
| 3 |     C1_LH2<-- HF |
| 4 | if C1_LHB1 - C2_LHB1 > Threshold_LF |
| 5 |     C1_LH2 <-- LF |
| 6 | if C3_LHB3 - C1_LHB3 > Threshold_HF |
| 7 |     C1_LH3 <-- HF |
| 8 | if C1_LHB1 - C3_LHB1 > Threshold_LF |
| 9 |     C1_LH3 <-- LF |

At line 1 of the pseudo code, each other core's health indicator is set to an initial value of OK by CORE_1.

At line 2, C1_LHB2 (T2) is subtracted from C2_LHB2 (T2), where: C2_LHB2 has a value of 100 at T2 that represents the locally stored current heartbeat count of CORE_2 that was retrieved by CORE_1 at T1; and C1_LHB2 has a value of 100 at T2 that is the current heartbeat count of CORE_2 as known by CORE_1 at T2, based on the local heartbeat vectors. It will be appreciated that the current heartbeat count of the "one core" at T2 is the heartbeat count of the "one core" that updated in the "another core's" local HBV during the "another core's" previous heartbeat operation, and subsequently and stored to shared memory as part of the "another core's" shared HBV.

If the difference between C1_LHB2 and C2_LHB2 is greater than a threshold, labeled "Threshold HF", CORE_1 updates its local health vector (C1_LHV) at line 3 of the pseudo code to show CORE_2 has a health status of HF (C1_LH2←HF), thus indicating that that CORE_1 has determined CORE_2 has experienced a high-frequency failure, e.g., it has updated its heartbeat more times than expected. Assuming Threshold HF is three (3), the health status of CORE_2 (C1_LH2) is not changed at line 3, as the difference between C1_LHB2 and C2_LHB2 based on the local HBVs at T0 of FIG. 8 is zero (100−100=0), and flow of the health status calculation proceeds to line 4 of Table 1.

At line 4, C2_LHB1 (T2) is subtracted from C1_LHB1 (T2), where: C1_LHB1 has a value of 101 at T2 that represents the locally stored current heartbeat count of CORE_1; and C2_LHB1 has a value of 100 at T2 that is the current heartbeat count of CORE_1 as known by CORE_2 at T2, based on the local heartbeat vectors. If the difference between C1_LHB1 and C2_LHB1 is greater than a threshold, labeled "Threshold_LF", CORE_1 sets its health status of CORE_2 (C1_LH2), at line 5 of the pseudo code of Table 1, to indicate that CORE_1 has determined that CORE_2 has experienced a low-frequency failure. Assuming Threshold_LF is three (3), the health status of CORE_2 (C1_LH2) is not changed at line 5, as the difference between C1_LHB1 and C2_LHB1 based on the local T2 HBVs of FIG. 8 is zero (101−100=1), and flow of the health status calculation proceeds to line 6 of Table 1.

At line 6, C1_LHB3 (T2) is subtracted from C3_LHB3 (T2), where: C3_LHB3 has a value of 100 at T2 that represents CORE_3's locally stored current heartbeat count, which was retrieved by CORE_1 T1; and C1_LHB3 has a value of 100 at T2 that is the current heartbeat count of CORE_3 as known by CORE_1 at T2, based on the local heartbeat vectors. If the difference between C1_LHB3 and C3_LHB3 is greater than Threshold HF, CORE_1 sets its health status of CORE_3 (C1_LH3) at line 7 of the pseudo code to indicate that CORE_1 has determined that that CORE_3 has experienced a high-frequency failure. However, because Threshold HF is presumed to be three (3), the health status of CORE_3 is not changed by line 7, as the difference is zero (100−100=0), and flow of the health status calculation proceeds to line 8 of Table 1.

At line 8, C3_LHB1 (T2) is subtracted from C1_LHB1 (T2), where: C1_LHB1 at T2 has a value of 101 at T2 that represents the locally stored current heartbeat count of CORE_1; and C3_LHB1 has a value of 100 at T2 that is the current heartbeat count of CORE_1 as known by CORE_3 at T2, based on the local heartbeat vectors. If the difference between C1_LHB1 and C3_LHB1 is greater than Threshold_LF, CORE_1 sets its health status of CORE_3 (C1_LH3), at line 5 of the pseudo code, to indicate that CORE_1 has determined that CORE_3 has experienced a low-frequency failure. However, because Threshold_LF is presumed to be three (3), the health status of CORE_3 (C1_LH3) is not changed from the default value of OK, as the difference between C1_LHB1 and C3_LHB1 is 1 (101−100=1).

After the health vectors have been calculated and stored to memory at T3, the failure detect circuitry 263 of CORE_1 determines whether either of CORE_2 and CORE_3 have failed. The failure detect circuitry 263 can be implemented based on the pseudo code of Table 2.

TABLE 2

CORE_1 Failure Detect Calculation

| | |
|---|---|
| 1 | if ((C1_SH2 == LF) and (C3_SH2 == LF)) |
| 2 | Fail_Detected ← (C2, LF); |
| 3 | if ((C1_SH2 == HF) and (C3_SH2 == HF)) |
| 4 | Fail_Detected ← (C2, HF); |
| 5 | if ((C1_SH3 == LF) and (C2_SH3 == LF)) |
| 6 | Fail_Detected ← (C3, LF); |
| 7 | if ((C1_SH3 == HF) and (C2_SH3 == HF)) |
| 8 | Fail_Detected ← (C3, HF); |

At line 1 of the pseudo code of Table 2, the status LF is compared to the locally stored values of C1_LH2 and C3_LH2 to determine whether the health status of CORE_2 as calculated by both CORE_1 and CORE_3 is LF. If so, line 2 will cause the failure detect circuitry 263 of CORE_1 to send a failure detected indicator that identifies CORE_2 as having experienced an LF failure.

At line 3 of the pseudo code of Table 2, the status HF is compared to the locally stored values of C1_LH2 and C3_LH2 to determine whether the health status of CORE_3 as calculated by both CORE_1 and CORE_2 is HF. If so, line 4 will cause the failure detect circuitry 263 to send a failure detected indicator that identifies CORE_2 as having experienced a HF failure.

At line 5 of the pseudo code of Table 2, the status LF is compared to the locally stored values of C1_LH2 and C3_LH2 to determine whether the health status of CORE_3 as calculated by both CORE_1 and CORE_3 is LF. If so, line 6 will cause the failure detect circuitry 263 of CORE_1 to send a failure detected indicator that identifies CORE_3 as having experienced an LF failure.

At line 7 of the pseudo code of Table 2, the status HF is compared to the locally stored values of C1_LH3 and C2_LH3 to determine whether the health status of CORE_3 as calculated by both CORE_1 and CORE_2 is HF. If so, line 8 will cause the failure detect circuitry 263 to send a failure detected indicator that identifies CORE_3.

Upon completion of failure detection by CORE_1, the vector write request circuitry 374 of CORE_1 is enabled to provide the vector write command to the shared access controller 364, as described previously, that results in vector write circuitry 377 updating CORE_1's HBV and health vector. Thus, as shown at T5 of FIG. 9, C1_LHV, which was updated by CORE_1 at T3, is stored to shared memory 167, as indicated by the parenthetical indicator "(T3)" at the fields C1_SH2 and C1_SH3 of C1_SHV. Also, at time T5, because the health vectors stored in local memory 267 of CORE_1 are no longer needed, because CORE_1's health vector is now stored shared memory 167, the health vectors in CORE_1's local memory are set to X to indicate they are no longer needed, and can therefore be used by other processes.

After CORE_1 completes its heartbeat operation at T4, CORE_2 retrieves the health vectors currently stored in shared memory 167 and stores them in its local memory at T5, as indicated in FIG. 9. The health calculator circuitry 375 of CORE_2 then calculates the health status of CORE_1 and CORE_3 based on the pseudo code of Table 3.

TABLE 3

CORE_2 Health Status Calculation

| | |
|---|---|
| 1 | C2_LH1, C2_LH3 ← OK; |
| 2 | if C1_LHB1 − C2_LHB1 > Threshold_HF |
| 3 | C2_LH1 ← HF |
| 4 | if C2_LHB2 − C1_LHB2 > Threshold_LF |
| 5 | C2_LH1 ← LF |
| 6 | if C3_LHB3 − C2_LHB3 > Threshold_HF |
| 7 | C2_LH3 ← HF |
| 8 | if C2_LHB2 − C3_LHB3 > Threshold_LF |
| 9 | C2_LH3 ← LF |

It will be appreciated that calculation of health vectors by CORE_2 proceeds in a similar manner as that described previously, with reference to CORE_1 from T1-T5, and results in the updated entries as indicated from T6-T10 in FIG. 9, including the updated entry T8 at which the calculated health vectors are stored by CORE_2 to local memory.

After CORE_2 completes its heartbeat operation, CORE_3 retrieves the health vectors currently stored in shared memory 167 and stores them in its local memory at T11, as indicated in FIG. 9. The health calculator circuitry 375 of CORE_3 then calculates the health status of CORE_1 and CORE_2 based on the pseudo code of Table 3.

TABLE 4

CORE_3 Health Status Calculation

| | |
|---|---|
| 1 | C3_LH1, C3_LH2 ← OK; |
| 2 | if C1_LHB1 − C3_LHB1 > Threshold_HF |
| 3 | C3_LH1 ← HF |

TABLE 4-continued

CORE_3 Health Status Calculation

| | |
|---|---|
| 4 | if C3__LHB3 - C1__LHB3 > Threshold__LF |
| 5 | C3__LH1 <-- LF |
| 6 | if C2__LHB2 - C3__LHB2 > Threshold__HF |
| 7 | C3__LH2 <-- HF |
| 8 | if C3__LHB3 - C2__LHB3 > Threshold__LF |
| 9 | C3__LH2 <-- LF |

It will be appreciated that calculation of health vectors by CORE_3 proceeds in a similar manner as that described previously with reference to CORE_1 and CORE_2 from T1-T10, and results in the updated entries as indicated from T11-T15 in FIG. 9, including the updated entry T13 at which the calculated health vectors are stored by CORE_3 to local memory.

Entries T16-T30 of FIG. 9 indicate the manner in which each core updates its health vectors at memories 167 and 267 during heartbeat cycle 2. As noted with reference to FIG. 8, the order in which each core implements its heartbeat operation during heartbeat cycle 2 is reversed from that of the heartbeat cycle 1. Thus, CORE_3 executes its heartbeat first in heartbeat cycle 2, followed by CORE_2 and CORE_3. The contents of the health vectors from T16 to T30 are not discussed in detail, as they have been updated in the same manner as described previously with reference to heartbeat cycle 1, just in a different order. It will be appreciated, based upon the health statuses of "OK" at entries of FIG. 9, that no core failure has been detected during heartbeat cycle 1 or heartbeat cycle 2. However, as shown in the tables of FIG. 10, during continued operation, CORE_3 experiences a condition, beginning in heartbeat cycle 3, that prevents it from executing its heartbeat operations.

Figure 10:
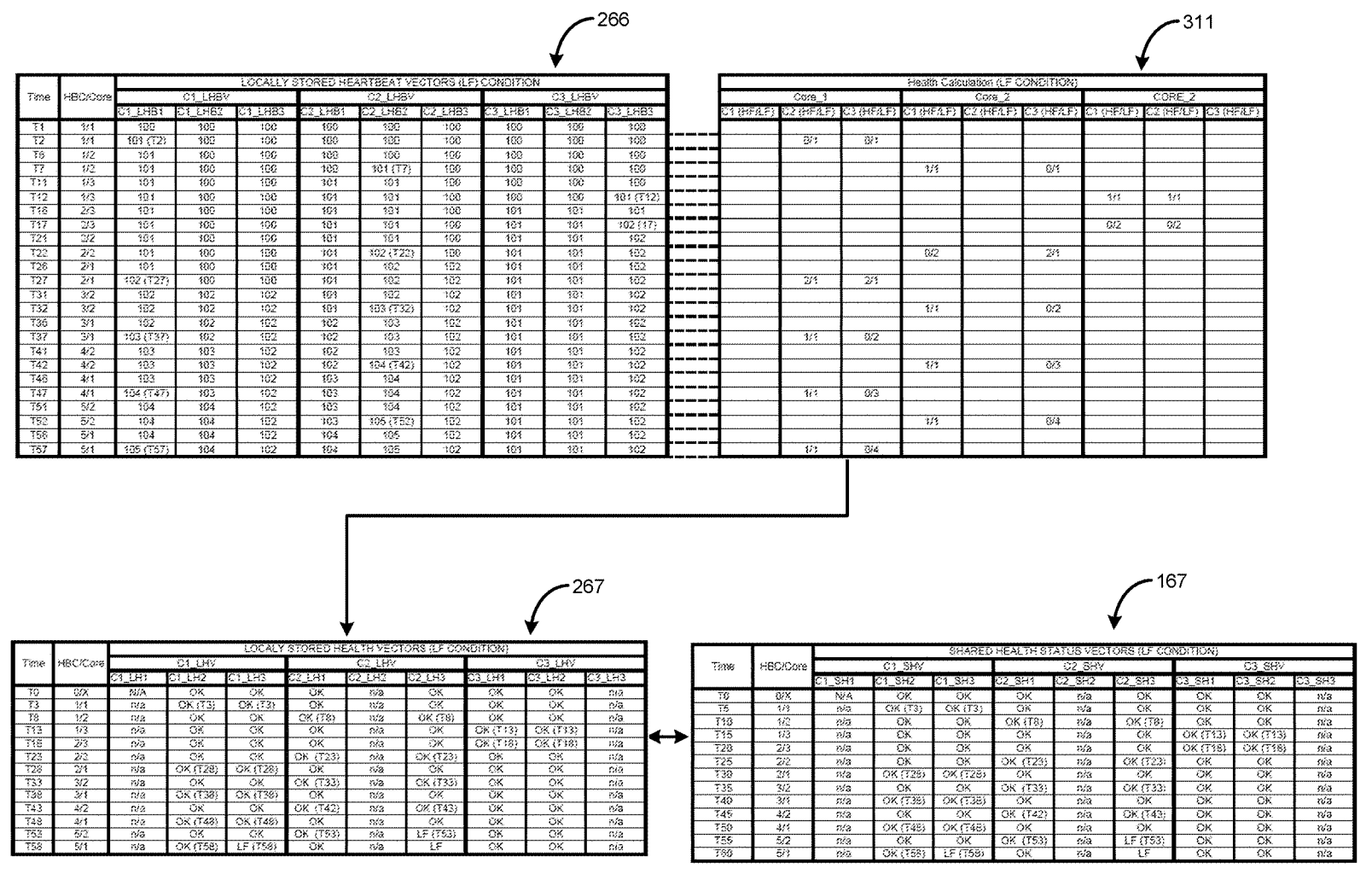

FIG. 10 includes shared memory tables 166, 167, and local memory table 266 having a subset of the entries T0-T30 that correspond to the entries previously discussed with reference to FIG. 8 and FIG. 9, during which each core executed its heartbeat operation in a normal manner during each heartbeat cycle. FIG. 10 additionally includes a table 311 that includes the differential result determined during each core's health calculations that is used to determine whether health of each other core. The first integer of each field of each entry of table 311 indicates the difference calculated, e.g., by the previous pseudo code, and used to determine a health status indicative of HF failure, while the second integer of each entry of table 311 indicates the difference calculated and used to determine a health status indicative of LF failure.

For example, field CORE_1:C2 (HF/LF) of the health calculation table 311 corresponding to time T2 of memory 266 has a value of "0/1"; where: the first integer value, zero (0), of the field is the difference between C2_LHB2 and C1_LHB2 as calculated at line 2 of the pseudo code of Table 1, and was used by CORE_1 to determine CORE_2 was not experiencing HF failure, by virtue of the calculated value (0) not being greater than Threshold HF (3); and the second integer value, one (1), of the field is the difference between C1_LHB1 and C2_LHB1 as calculated at line 4 of the pseudo code of Table 1, and was used by CORE_1 to determine CORE_3 was not experiencing LF failure, by virtue of the calculated value (1) not being greater than Threshold_LF (3). It will be appreciated, that the values of fields corresponding to column CORE_2:C1 (HF/LF) and CORE_2:C3 (HF/LF) in table 311, are the differential values calculated by CORE_2 to detect failure of CORE_1 and CORE_3, respectively, and that the values of entries corresponding to column CORE_3:C1 (HF/LF) and CORE_3:C2 (HF/LF) in table 311, are the differential values calculated by CORE_3 to detect failure of CORE_1 and CORE_2, respectively.

As indicated in column HBC/Time of memory table 266 of FIG. 10, CORE_2 is the first core to execute its heartbeat operation during each of heartbeat cycles 3-5, and CORE_1 is the next core to execute its heartbeat during these cycles. However, there is no corresponding entry in table 266 for CORE_3 during heartbeat cycles 3-5, which indicates CORE_3 does not execute heartbeat operation during these cycles.

As shown in memory table 266 of FIG. 10, during heartbeat cycle 3 CORE_2 updates its current HBC in local memory 266 at T32, after loading shared vectors from memory 166 to its local memory 266 at T31. Entry CORE_2:C1 (HF/LF) of table 311 indicates that differences in heartbeat counts calculated by CORE_2, using the T32 entry from local memory 266, to determine whether CORE_1 is in HF or LF failure mode are both one (1). Since neither of these values is above its respective failure threshold (3), no failure of CORE_1 is detected by CORE_2, as indicated by entry C2_LH1 of memory table 267 of FIG. 10 being updated to OK at T33. Entry CORE_2:C3 (HF/LF) of table 311 indicates that differences in heartbeat counts calculated by CORE_2, using the T32 entries, to determine whether CORE_3 is in HF or LF failure mode are zero (0) and one (1), respectively. Since neither of these values is above its respective failure threshold (3), no failure of CORE_3 is detected by CORE_2, as indicated by entry C2_LH3 of memory table 267 of FIG. 10 being updated to OK at T33.

Next during heartbeat cycle 3, as shown in memory table 266 of FIG. 10, CORE_1 updates its current HBC in local memory 266 at T37, after loading shared vectors from memory 166 to its local memory 266 at T36. Entry CORE_1:C2 (HF/LF) of table 311 indicates that differences in heartbeat counts calculated by CORE_1, using the T37 entries from local memory 266, to determine whether CORE_2 is in HF or LF failure mode are both one (1). Since neither of these values is above its respective failure threshold (3), no failure of CORE_2 is detected by CORE_1, as indicated by entry C1_LH2 of memory table 267 of FIG. 10 being updated to OK at T38. Entry CORE_1:C3 (HF/LF) of table 311 indicates that differences in heartbeat counts calculated by CORE_1, using the T37 entries, to determine whether CORE_3 is in HF or LF failure mode are zero (0) and one (2), respectively. Since neither of these values is above its respective failure threshold (3), no failure of CORE_3 is detected by CORE_1, as indicated by entry C1_LH3 of memory table 267 of FIG. 10 being updated to OK at T38.

Next, during heartbeat cycle 4, CORE_2 updates its current HBC in local memory 266 at T42, after loading shared vectors from memory 166 to its local memory 266 at T41. Entry CORE_2:C1 (HF/LF) of table 311 indicates that differences in heartbeat counts calculated by CORE_2, using the T34 entries from local memory 266, to determine whether CORE_1 is in HF or LF failure mode are both one (1). Since neither of these values is above its respective failure threshold (3), no failure of CORE_1 is detected by CORE_2, as indicated by entry C2_LH1 of memory table 267 of FIG. 10 being updated to OK at T43. Entry CORE_2:C3 (HF/LF) of table 311 indicates that differences in heartbeat counts calculated by CORE_2, using the T42 entries, to determine whether CORE_3 is in HF or LF failure mode are zero (0) and three (3), respectively. Since neither of these values is above its respective failure threshold (3), no failure of CORE_3 is detected by CORE_2, as indicated by entry C2_LH3 of memory table 267 of FIG. 10 being updated to OK at T43.

Next, during heartbeat cycle 4, CORE_1 updates its current HBC in local memory 266 at T47, after loading shared vectors from memory 166 to its local memory 266 at T46. Entry CORE_1:C2 (HF/LF) of table 311 indicates that differences in heartbeat counts calculated by CORE_1, using the T34 entries from local memory 266, to determine whether CORE_2 is in HF or LF failure mode are both one (1). Since neither of these values is above its respective failure threshold (3), no failure of CORE_2 is detected by CORE_1, as indicated by entry C1_LH2 of memory table 267 of FIG. 10 being updated to OK at T48. Entry CORE_1: C3 (HF/LF) of table 311 indicates that differences in heartbeat counts calculated by CORE_1, using the T34 entries, to determine whether CORE_3 is in HF or LF failure mode are zero (0) and three (3), respectively. Since neither of these values is above its respective failure threshold (3), no failure of CORE_3 is detected by CORE_1, as indicated by entry C1_LH3 of memory table 267 of FIG. 10 being updated to OK at T48.

Next, during heartbeat cycle 5, CORE_2 updates its current HBC in local memory 266 at T52, after loading shared vectors from memory 166 to its local memory 266 at T51. Entry CORE_2:C1 (HF/LF) of table 311 indicates that differences in heartbeat counts calculated by CORE_2, using the T52 entries from local memory 266, to determine whether CORE_1 is in HF or LF failure mode are both one (1). Since neither of these values is above its respective failure threshold (3), no failure of CORE_1 is detected by CORE_2, as indicated by entry C2_LH1 of memory table 267 of FIG. 10 being updated to OK at T53. Entry CORE_2: C3 (HF/LF) of table 311 indicates that differences in heartbeat counts calculated by CORE_2, using the T52 entries, to determine whether CORE_3 is in HF or LF failure mode are zero (0) and four (4), respectively. Since the LF indicator of four (4) is greater than Threshold HF (3), CORE_2 determines CORE_3 has a health status of LF, indicating CORE_3 appears to be experiencing a low-frequency failure, as indicated by entry C2_LH3 of memory table 267 of FIG. 10 being updated to LF at T53. Note, however, that the failure detect circuitry 363 of CORE_2 will not detect a failure of CORE_3 because no other core has determined the health status of CORE_3 to be LF, as indicated by the health statuses of local memory 266.

Next, during heartbeat cycle 5, CORE_1 updates its current HBC in local memory 266 at T57, after loading shared vectors from memory 166 to its local memory 266 at T56. Entry CORE_1:C2 (HF/LF) of table 311 indicates that differences in heartbeat counts calculated by CORE_1, using the T57 entries from local memory 266, to determine whether CORE_2 is in HF or LF failure mode are both one (1). Since neither of these values is above its respective failure threshold (3), no failure of CORE_2 is detected by CORE_1, as indicated by entry C1_LH2 of memory table 267 of FIG. 10 being updated to OK at T58. Entry CORE_1: C3 (HF/LF) of table 311 indicates that differences in heartbeat counts calculated by CORE_1, using the T57 entries to determine whether CORE_3 is in HF or LF failure mode are zero (0) and four (4), respectively. Since the LF indicator of four (4) is greater than Threshold HF (3), CORE_1 determines CORE_3 has a health status of LF, indicating CORE_3 appears to be experiencing a low-frequency failure, as indicated by entry C1_LH3 of memory table 267 of FIG. 10 being updated to LF at T58. Because local memory 267 at T58 indicates that both CORE_1 and CORE_2 have calculated a health status of LF for CORE_3 the failure detect circuitry 363 of CORE_1 will determine a LF failure of CORE_3 has occurred, and send a failure detected indicator to the reaction circuitry 140 (FIG. 1) so that remedial action can be taken. CORE_1 ends its heartbeat operation by updating its health factor in shared memory 167 at T60.

In response to receiving the indicator that CORE_3 has failed, the reaction circuitry 140 can take appropriate remedial actions. For example, the reaction circuitry can perform a diagnostic of CORE_3, shut down CORE_3, reset CORE_3, further diagnose the failure of CORE_3, otherwise attempt to correct the problem of the CORE_3, the like, and combinations thereof.

In an embodiment where it is desirable to conclude that a core is faulty from the perspective of the entire multi-core system, the healthy cores should all agree as to a particular core's failure, thus achieving Interactive Consistency (IC). There can be several challenges to achieving IC with traditional systems. For example, the data exchanged amongst the cores may include data from faulty core(s), which can lead to erroneous health status calculations. Also, the observation of other cores' health statuses can deviate in time relative to an evaluating core, such as due to the relative order in which heartbeat operations are implemented amongst the cores. Moreover, a specific core may have an observed health status that changes between OK and a failing status due to intermittent failure.

According to an embodiment, it can be presumed that that only a single core of a multi-core system can fail at a time, thus facilitating the conclusion by an evaluating core that a core is truly failing when only one other core agrees on that core's failing health status, such as that described in the previous example. Despite the failing health status agreement of two cores being enough for detecting a faulty core, more cores agreeing on the failing health status can add robustness to the agreement. For example, if there are n cores, n≥3, the number of cores required to agree on a failing status before the core is deemed to be failing can be from two to n−1 as there are always n−1 healthy cores. The robustness can be improved even if just more than half of the cores agree as to the failing health status. So, for instance the number of required agreeing cores might be n/2+1 where the division is the integer division.

Figure 11:
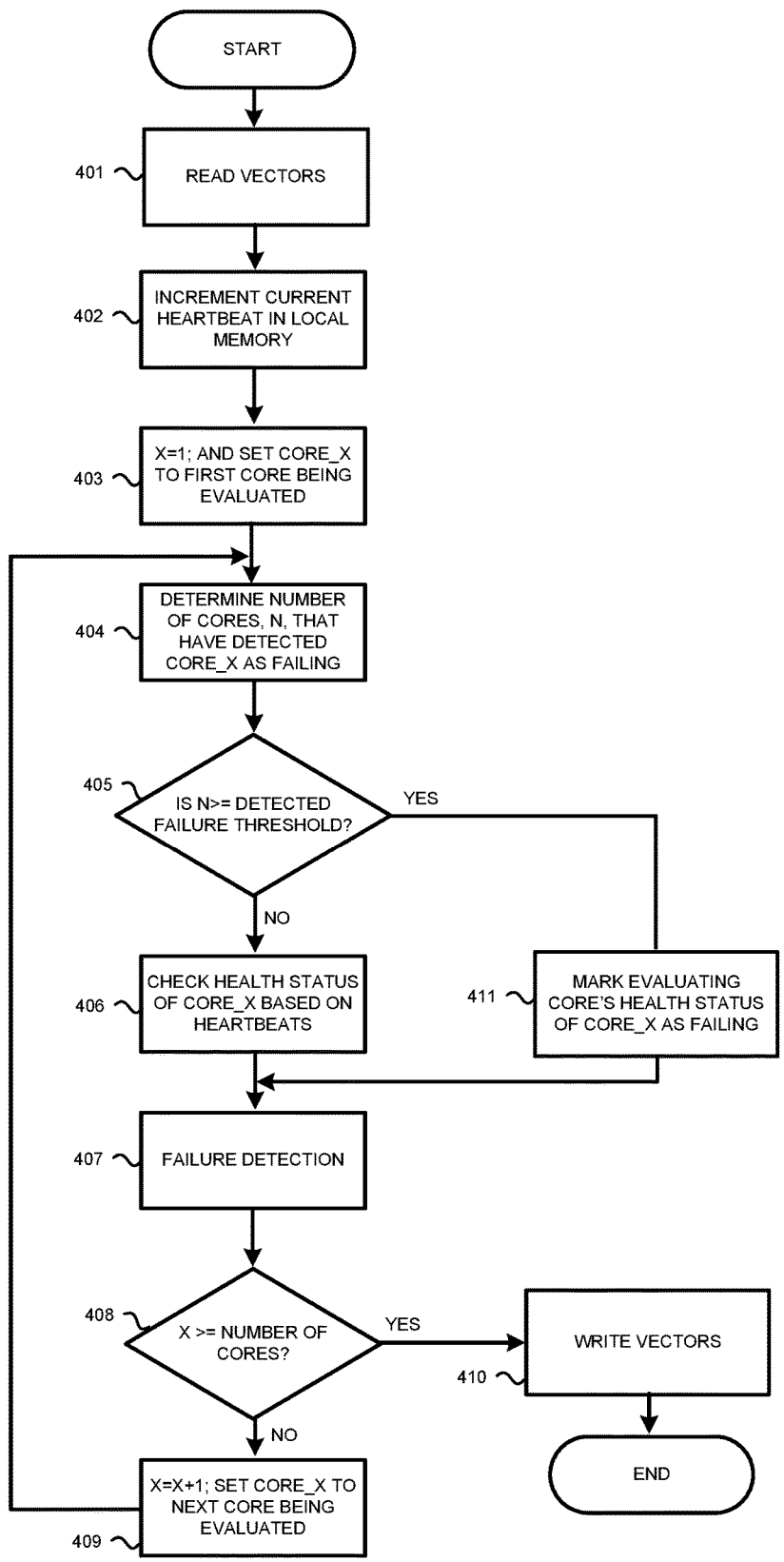
FIG. 11 is a flow diagram of a particular embodiment of the present disclosure.

Irrespective of the number cores needing to agree on a failing health status to detect a particular core's failure, the cores shall always agree on the failing health status in a converging and decisive way. In other words, the heartbeat operation executed each core shall eventually determine the failing health status of a failing core. That means that even if fewer than n−1 agreeing cores is sufficient to identify a core as faulty, the heartbeat operation shall eventually achieve an agreement of all n−1 healthy cores. However, it might not straight-forward for all cores converge as the failure of a core based on the heartbeat counts, especially in the case when heartbeat operations of different cores can interleave. To ensure efficient convergence, and Interactive Consistency amongst healthy cores, the failure detection algorithm implemented by each core can initially determine the health status of a particular core using only the health vectors of the other cores, and only subsequently perform the health status calculation of that particular core using the heartbeat counts when the health vectors of the other cores do not indicate failure. This will be better understood with reference to the method of FIG. 11.

At block 401, the heartbeat operation of a core begins by reading each core's health and heartbeat vectors from shared memory to the core's local memory. At block 402, the implementing core, e.g., the core executing the heartbeat operation, increments its current heartbeat in local memory. At block 403 a variable X is set equal to one (1), and core indicator CORE_X is set to identify an initial core to be evaluated. For example, the initial core to be evaluated can be CORE_2 if CORE_1 is the evaluating core; alternatively CORE_1 can be initial core to be evaluated if any other core is the evaluating core. By way of example, it will be presumed CORE_2 is the evaluating core, and CORE_X, therefore, identifies CORE_1 as the initial core to be evaluated. It is further presumed that there are a total of eight (8) cores (CORE_1-CORE_8) in the multi-core system.

At block 404, the evaluating core determines the number of cores having calculated the same failing health status of CORE_X. Thus, when CORE_X corresponds to CORE_1, the number of cores (CORE_2 through CORE_8) that have determined CORE_1 to have a health status of LF is determined, as is the number of the other cores that have determined CORE_1 to have a health status HF. In an alternate embodiment, the evaluating core would base the number of cores having determined CORE_1 to have a health status of LF only on the other core, e.g., CORE_3 through CORE_8.

At block 405, it is determined whether the number of cores agreeing that CORE_X has a particular failing health status is greater than a failure threshold. For example, it can be determined whether between two and six of CORE_2-CORE_8 have calculated the health status of CORE_1 to be HF or LF. The number of agreeing cores can be fixed or programmable. It will be appreciated that choosing the number of agreeing cores to be 2 will result in the soonest convergence amongst all good processors. If there is a sufficient number of cores agreeing that CORE_1 is failing, flow proceeds to block 411, otherwise flow proceeds to block 406.

At block 406, in response to the threshold not being met at block 405, the health status of CORE_1 is determined by the evaluating core based upon the heartbeat counts as previously described. At block 407, failure detection is performed as described at Table 2.

At block 408, it is determined whether any other cores are to be evaluated. For example, for an eight core system, each core will evaluate the health status of seven (7) other cores. Thus, if X is greater than, or equal to seven (7), there are no further cores to be evaluated, and flow can proceed to block 410, where the evaluating core's local vectors are written to shared memory as described previously. Otherwise, if X is less than seven (7), flow can proceed to block 409, where X is incremented, and CORE_X is set to correspond to a next core to be evaluated, e.g., CORE_X is updated to correspond to CORE_3 as the next core to be evaluated by CORE_2. Flow proceeds from block 409 to block 404.

If at block 405 it was determined that a sufficient number of cores did agreed on a failing health status of CORE_X, flow proceeds to block 411. At block 411, the evaluating core will set its health status of CORE_X to the failing health status. For example, if a sufficient number of CORE_3-CORE_8 agreed that CORE_1 has a health status of LF, CORE_2 will set its own health status of CORE_1 to LF, and flow will proceed to block 407 so that failure detection can be performed. In this manner, using the assumption that only one core can fail at a time, interactive consistency can obtained more efficiently.

Implementing a heartbeat procedure, as described above, can be accomplished without saving an extensive history for each core, as known in the industry. Instead, only one set of heartbeat count vectors and health vectors need to be stored in shared memory, and accessed by each core only while implementing the heart beat operation.

In the foregoing specification, the invention has been described regarding specific examples of embodiments of the invention. It will, however, be evident that various modifications and changes may be made therein without departing from the broader spirit and scope of the invention as set forth in the appended claims. For example, it will be appreciated that while the heartbeat operations performed by the plurality of cores 110 have been described as atomic with respect to each other, in other embodiments the heartbeat operations can be interleaved. That is, two or more of the cores can concurrently perform their respective heartbeat operation. Thus, for example, one core can read the vectors from shared memory, and begin performing its heartbeat operation, while another core is already performing its heartbeat operation. To preserve data integrity, however, when a vector is being written to shared memory by its owning core, none of the other cores should be reading that vector at the same time.

It will also be appreciated, that the heartbeat protocol can be implemented by a core executing instructions, by a state machine, the like, and combinations thereof. For example, the heartbeat operation can be implemented by circuitry that includes the pipeline of the core retrieving and executing instructions from memory that has itself been configured to store instructions that implement the various features of heartbeat operations described herein.

In a first aspect, a method can include storing to local memory of a first core, from shared memory of a system, during a first heartbeat cycle, a plurality of local heartbeat vectors, including a first local heartbeat vector (HBV) of a first core, a second local HBV of a second core, and a third local HBV of a third core, wherein, each cores' local HBV includes a first HBC for the first core, a second HBC for the second core, and a third HBC for the third core, updating, by the first core during the first heartbeat cycle, the first HBC of the first local HBV, wherein no other core's current HBC is updated by the first core during the first heartbeat cycle, determining, by the first core during the first heartbeat cycle, a health status of the second core based solely upon the plurality of local HBVs stored at the first core after the first HBC has been updated, determining, by the first core during the first heartbeat cycle, a health status of the third core based solely upon the plurality of local HBVs stored at the first core after the first HBC has been updated, and updating, by the first core during the first heartbeat cycle after the first HBC has been updated, a shared HBV of the first core in shared memory with an updated HBV based upon the first HBC of the first local HBV, the second HBC of the second local HBV, and the third HBC of the third local HBV.

In one embodiment of the first aspect, the method includes determining the health status of the second core is based upon a comparison of the second HBC of the first local HBV and the second HBC of the second local HBV. In a more particular embodiment of the one embodiment, the method includes determining the health status of the second core further comprises: determining the health status of the second core is OK if a difference between the second HBC of the first local HBV and the second HBC of the second local HBV does not meet a fail threshold, otherwise determining the health status of the core is NOT OK. In an even more particular embodiment of the more particular embodiment, in response to determining the health status of the second core is NOT OK, determining if the health status of the second core as determined by the third core prior to storing the shared HBV of the third core was also NOT OK, and if so providing, by the first core, a fail indicator to indicate a failure of the second core has been detected, otherwise not providing a fail indicator. In yet an even more particular embodiment of the even more particular embodiment, the method includes, storing, during the first heartbeat cycle prior to determining if the health status of the second core as determined by the third core was also NOT OK, shared health vectors for each one of the first core, the second core, and the third core, as a plurality of local health vectors including a first local health vector, a second local health vector, and a third local health vector, respectively, wherein the third local health vector includes the health status of the second core as determined by the third core. In a different yet even more particular embodiment of the particular embodiment, the method includes: implementing a remedial action by the system in response to the first core providing the fail indicator. In a different even more particular embodiment of the first aspect, determining the health status of the second core is NOT OK includes determining that the second core is experiencing on of a high-frequency failure or a low-frequency failure.

In another embodiment of the first aspect, the method includes updating the first HBC of the first local HBV includes incrementing the first HBC.

It is to be understood that the architectures depicted herein are merely exemplary, and that in fact many other architectures can be implemented which achieve the same functionality. Furthermore, those skilled in the art will recognize that boundaries between the functionality of the above described operations merely illustrative.

What is claimed is:

1. A method comprising:
   storing to local memory of a first core, from shared memory of a system, during a first heartbeat cycle, a plurality of local heartbeat vectors, including a first local heartbeat vector (HBV) of a first core, a second local HBV of a second core, and a third local HBV of a third core, wherein, each cores' local HBV includes a first HeartBeat Count (HBC) for the first core, a second HBC for the second core, and a third HBC for the third core;
   updating, by the first core during the first heartbeat cycle, the first HBC of the first local HBV, wherein no other core's current HBC is updated by the first core during the first heartbeat cycle;
   determining, by the first core during the first heartbeat cycle, a health status of the second core based solely upon the plurality of local HBVs stored at the first core after the first HBC has been updated;
   determining, by the first core during the first heartbeat cycle, a health status of the third core based solely upon the plurality of local HBVs stored at the first core after the first HBC has been updated; and
   updating, by the first core during the first heartbeat cycle after the first HBC has been updated, a shared HBV of the first core in shared memory with an updated HBV based upon the first HBC of the first local HBV, the second HBC of the second local HBV, and the third HBC of the third local HBV.

2. The method of claim 1, wherein determining the health status of the second core is based upon a comparison of the second HBC of the first local HBV and the second HBC of the second local HBV.

3. The method of claim 2, wherein determining the health status of the second core further comprises:
   determining the health status of the second core is OK if a difference between the second HBC of the first local HBV and the second HBC of the second local HBV does not meet a fail threshold, otherwise determining the health status of the core is NOT OK.

4. The method of claim 3 further comprising:
   in response to determining the health status of the second core is NOT OK, determining if the health status of the second core as determined by the third core prior to storing the shared HBV of the third core was also NOT OK, and if so providing, by the first core, a fail indicator to indicate a failure of the second core has been detected, otherwise not providing a fail indicator.

5. The method of claim 4 further comprising:
   storing, during the first heartbeat cycle prior to determining if the health status of the second core as determined by the third core was also NOT OK, shared health vectors for each one of the first core, the second core, and the third core, as a plurality of local health vectors including a first local health vector, a second local health vector, and a third local health vector, respectively, wherein the third local health vector includes the health status of the second core as determined by the third core.

6. The method of claim 4 further comprising:
   implementing a remedial action by the system in response to the first core providing the fail indicator.

7. The method of claim 3, wherein determining the health status of the second core is NOT OK includes determining that the second core is experiencing on of a high-frequency failure or a low-frequency failure.

8. The method of claim 1 wherein updating the first HBC of the first local HBV includes incrementing the first HBC.

9. The method of claim 1 further comprising:
   storing to local memory of the first core, from the shared memory, during a second heartbeat cycle, the plurality of local heartbeat vectors;
   updating, by the first core during the second heartbeat cycle, the first HBC of the first core in the first local HBV, wherein no other core's current HBC is updated by the first core during the second heartbeat cycle;
   determining, by the first core during the second heartbeat cycle, a health status of the second core based solely upon the plurality of local HBVs after the first HBC of the first local HBV has been updated;
   determining, by the first core during the second heartbeat cycle, a health status of the third core based solely upon the plurality of local HBVs after the first HBC of the first local HBV has been updated; and
   updating, by the first core during the second heartbeat cycle after the first HBC has been updated, the shared HBV of the first core in shared memory with the first HBC of the first local HBV, the second HBC of the second local HBV, and the third HBC of the third local HBV.

10. The method of claim 1 further comprising:
    storing, during the first heartbeat cycle and after the first core has updated its shared HBV, the shared heartbeat vector (HBV) of the first core, the shared HBV of the second core, and the shared HBV of the third core from the shared memory to local memory of the core as a plurality of local HBVs including a first local HBV, a second local HBV, and a third local HBV, respectively;

during the first heartbeat cycle, storing to local memory of a second core from the shared memory after the first core has updated its shared HBV, the plurality of local heartbeat vectors;
updating, by the second core during the first heartbeat cycle, the second HBC of the second local HBV, wherein no other HBC of the plurality of local HBVs is updated in the local memory of the second core during the first heartbeat cycle;
determining, by the second core during the first heartbeat cycle, a health status of the first core based solely upon the plurality of local HBVs stored at the second core after the second HBC has been updated;
determining, by the second core during the first heartbeat cycle, a health status of the first core based solely upon the plurality of local HBVs stored at the second core after the second HBC has been updated; and
updating, by the second core during the first heartbeat cycle after the first HBC has been updated, a shared HBV of the second core in shared memory with an updated HBV based upon the first HBC of the first local HBV, the second HBC of the second local HBV, and the third HBC of the third local HBV.

11. The method of claim 10, wherein the storing, updating, determinings, and updating of the first core and of the second core are atomic to each other.

12. The method of claim 10, wherein one or more of the storing, updating, determinings, and updating of the first core can overlap with the storing of the second core.

13. A device comprising:
a shared memory configured to store a plurality of shared HeartBeat Vectors (HBVs), including a first shared HBV of a first core, a second shared HBV of a second core, and a third shared HBV of a third core, each HBV includes a HeartBeat Count (HBC) of each core, including a first HBC of the first core, a second HBC of the second core, and a third HBC of the third core;
the first core coupled to the shared memory and includes:
local memory,
a bus controller coupled to the local memory and to the shared memory,
a heartbeat controller coupled to the bus controller to implement heartbeat operations, during each heartbeat operation, the heartbeat controller is configured to:
enable the bus controller to store the plurality of shared HBVs at the local memory as plurality of local HBVs, including a first local HBV, a second local HBV, and a third local HBV;
enable heartbeat update circuitry that is configured to update the first HBC of the first local HBV;
enable health calculator circuitry that is configured to calculate a health of the second core based on the first and second HBCs of the first and second local HBVs, and configured to calculate a health of the third core based on the first and third HBCs of the first and third local HBVs; and
enable the bus controller to update the first shared HBV based upon the first HBC of the first local HBV, the second HBC of the second local HBV, and the third HBC of the third local HBV.

14. The device of claim 13, wherein the heartbeat controller further enables the bus controller to store a plurality of share health vectors from the shared memory to the local memory as a plurality of local health vectors, including a first local health vector of the first core, a second local health vector of the second core, and a third local health vector of the third core, and
the first heartbeat controller is further configured to enable failure detect circuitry to provide a fail indicator if calculated heath of the second core is NOT OK and a stored health of the second core in the third local health vector is the same as the calculated heath of the second core.

15. The device of claim 14, wherein the heartbeat controller further enables the bus controller to update a first shared health vector based upon the calculated health of the first second core and of the third core.

16. The device of claim 14 further comprising reaction circuitry coupled to the first core, the reaction circuitry configured to implement a remedial action in response to receiving the fail indicator.

17. The device of claim 13, wherein
the second core is coupled to the shared memory and includes:
local memory,
a bus controller coupled to the local memory and to the shared memory,
a heartbeat controller coupled to the bus controller to implement heartbeat operations, during each heartbeat operation, the heartbeat controller is configured to:
enable the bus controller to store the plurality of shared HBVs at the local memory as the plurality of local HBVs;
enable heartbeat update circuitry that is configured to update the second HBC of the second local HBV;
enable health calculator circuitry that is configured to calculate a health of the first core based on the first and second HBCs of the first and second local HBVs, and configured to calculate a health of the third core based on the second and third HBCs of the second and third local HBVs; and
enable the bus controller to update the second shared HBV based upon the first HBC of the first local HBV, the second HBC of the second local HBV, and the third HBC of the third local HBV.

18. A method comprising:
storing to local memory of a first core, from shared memory of a system, during a first heartbeat cycle, a plurality of local heartbeat vectors and a plurality of local health vectors,
the plurality of local heartbeat vectors include a first local heartbeat vector (HBV) of a first core, a second local HBV of a second core, and a third local HBV of a third core, wherein, each cores' local HBV includes a first HBC of the first core, a second HBC of the second core, and a third HBC of the third core,
the plurality of local health vectors include a first local health vector of the first core, a second local health vector of a second core, and a third local health vector of a third core, wherein, each cores' local health includes a health status of each other core, and
determining, by the first core during the first heartbeat cycle, a first health status of the second core based solely upon the plurality of local health vectors, wherein if the first health status of the second core is determined to be NOT OK, based upon the plurality of local health vectors, updating the health status of the second core in the first local health vector to be NOT OK, otherwise, determining, a second health status of the second core based solely upon the plurality of local HBVs stored at the first core.

19. The method of claim 18 further comprising:

updating, by the first core during the first heartbeat cycle, the health vector of the second core stored in shared memory based upon the first health status if the first health status is NOT OK, otherwise, updating, by the first core during the first heartbeat cycle, the health vector of the second core stored in shared memory based upon the second health status.

20. The method of claim 19, wherein the health status of NOT OK indicates one of a high-frequency failure and a low-frequency failure of the second core.

* * * * *